E. J. HUDSON.
Cotton Planter.

No. 104,157. Patented June 14, 1870.

Witnesses:
Victor Hagmann
C. A. Pettit

Inventor:
E. J. Hudson
per Munn & Co.
Attorneys.

United States Patent Office.

EDWARD J. HUDSON, OF GOLCONDA, ILLINOIS.

Letters Patent No. 104,157, dated June 14, 1870.

IMPROVEMENT IN COTTON-SEED PLANTERS.

The Schedule referred to in these Letters Patent and making part of the same.

*To all whom it may concern:*

Be it known that I, EDWARD J. HUDSON, of Golconda, in the county of Pope and State of Illinois, have invented a new and improved Cotton-seed Planter; and I do hereby declare that the following is a full, clear, and exact description of the construction and operation of the same, reference being had to the accompanying drawing making a part of this specification, in which—

Figure 1:
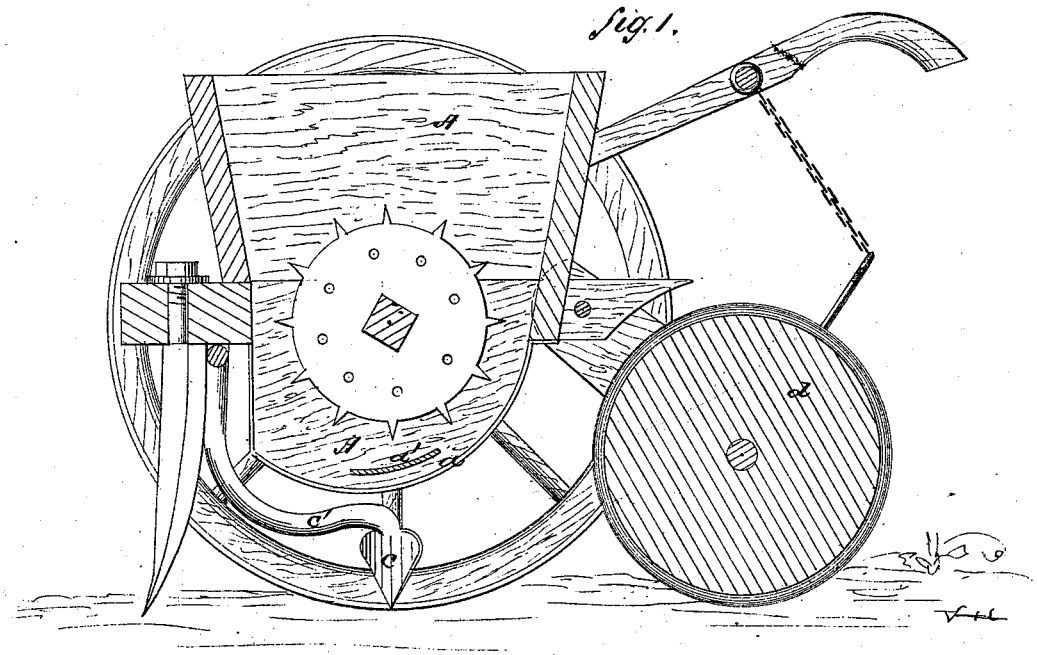
Figure 1 is a plan view.
Figure 2:
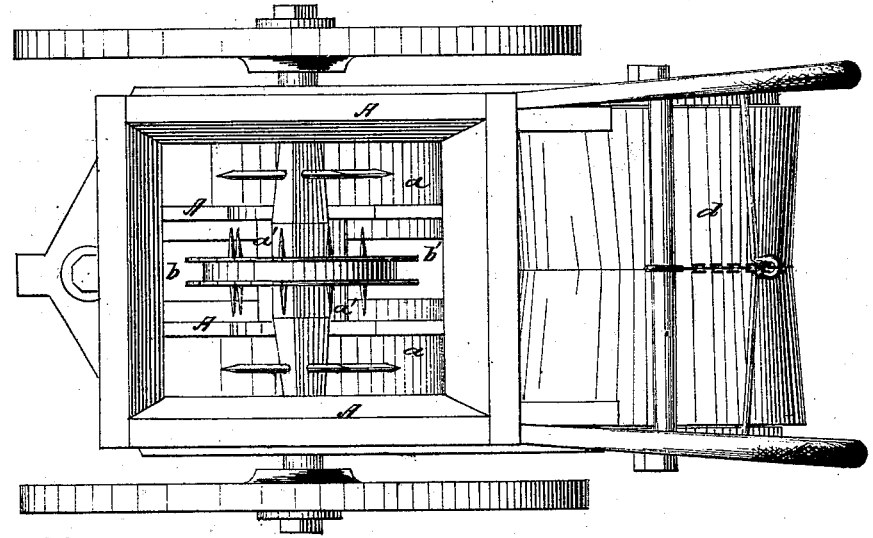
Figure 2 is a longitudinal vertical section.

This invention has for its object to sow two "stands" of cotton-seed at one and the same time, one of which shall be covered deeply and the other shallow, in order that, if the weather be wet, the shallow-covered seed may germinate, and, if the weather be dry, the deeply-covered seed may come up, and the farmer thus be reasonably sure of a crop in either alternative.

In the drawing—

A is the seed-box, having a slot, $a$, made lengthwise of its bottom, across which slot is placed a separator, $a'$, of sheet metal. Two slots $b$ $b'$ are thus made for the escape of the seed. That which falls through the orifice $b$ is covered by the double shovels $c$ $c$, placed immediately beneath the separator $a'$, one at each side of the slot $a$, and attached, by curved shanks $c'$ $c'$, to the frame of the seed-box.

A colter, N, runs before the shovels. The "stand" of seed issuing out of the orifice $b$ is, by these means, deeply covered. That escaping through the orifice $b'$ falls on the loose dirt and ridges cast up by the colter and shovels, all of which is beveled off, and the seed slightly covered by the heavy roller $d$ that follows in rear of the machine.

In very wet seasons deeply-covered seed is extremely liable to rot before sprouting, while seed thinly covered stands a better chance. On the other hand, in very dry seasons, thinly-covered seed generally dries up and amounts to nothing, while that deeply covered is more likely to spring up.

By my apparatus, if the farmer is willing to make a liberal use of seed, he may provide against the contingencies of the weather to a considerable extent.

Having thus described my invention,

What I claim as new, and desire to secure by Letters Patent, is—

The separator $a'$, in combination with the double shovels $c$ $c$ and roller $d$, in the manner and for the purpose described.

E. J. HUDSON.

Witnesses:
   D. GLASS,
   LEWIS McCOY.